Oct. 20, 1970 — R. G. GIRARD — 3,534,491

SELF-SUPPORTING SIGN

Filed Sept. 18, 1967 — 4 Sheets-Sheet 1

INVENTOR.
RAYMOND G. GIRARD
BY
Barlow & Barlow
ATTORNEYS

Oct. 20, 1970     R. G. GIRARD     3,534,491

SELF-SUPPORTING SIGN

Filed Sept. 18, 1967     4 Sheets-Sheet 2

INVENTOR.
RAYMOND G. GIRARD
BY
*Barlow & Barlow*
ATTORNEYS

Oct. 20, 1970 — R. G. GIRARD — 3,534,491
SELF-SUPPORTING SIGN
Filed Sept. 18, 1967 — 4 Sheets-Sheet 3

INVENTOR.
RAYMOND G. GIRARD
BY
Barlow & Barlow
ATTORNEYS

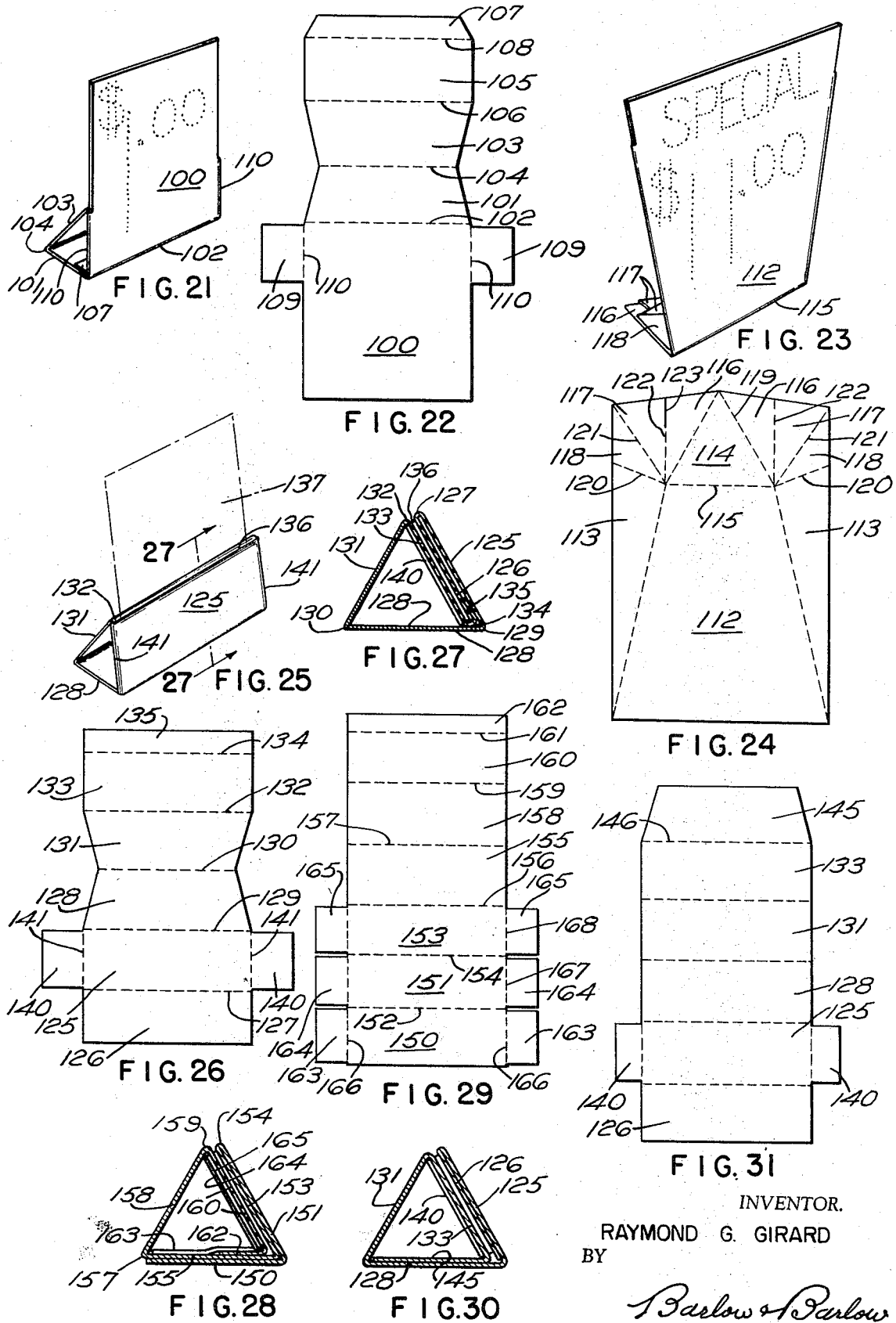

United States Patent Office 3,534,491
Patented Oct. 20, 1970

3,534,491
SELF-SUPPORTING SIGN
Raymond G. Girard, 3627 Acushnet Ave.,
New Bedford, Mass. 02745
Filed Sept. 18, 1967, Ser. No. 668,579
Int. Cl. G09f 1/00
U.S. Cl. 40—124.1                                     3 Claims

ABSTRACT OF THE DISCLOSURE

A self-supporting sign for displaying the price of an article of furniture or the like folded from a single sheet of cardboard in such a way that it will be in a standing-up position rearwardly inclined to present an obverse surface.

BACKGROUND OF THE INVENTION

Display signs of this character are usually in easel-like form with a prop extending from above the center at the back of the display as a leg to support it in position. This frequently requires two pieces of material attached together or double the length of material of the display surface.

SUMMARY OF THE INVENTION

This self-supporting sign comprises a display section from the lower edge of which there is folded rearwardly a base section, and from one or both sides of the display section a side section or sections are folded which are attached to the base section so as to provide a rigid hollow-like structure that will stand by itself.

BRIEF DESCRIPTION OF THE DRAWINGS

FIG. 21 is a perspective view of a further modification;

FIG. 22 is a plan view of a sheet cut out in the shape to form FIG. 21;

FIG. 23 is a perspective view of a further modification;

FIG. 24 is a plan view of a sheet cut out in the shape to form FIG. 23;

FIG. 25 is a perspective view of a further modification;

FIG. 26 is a plan view of a sheet cut out in the shape to form FIG. 25;

FIG. 27 is a section on line 27—27 of FIG. 25;

FIG. 28 is a sectional view of a further modification;

FIG. 29 is a plan view of a sheet cut out in the shape to form FIG. 28;

FIG. 30 is a sectional view of a further modification; and

FIG. 31 is a plan view of a sheet cut out in the shape to form FIG. 30.

DESCRIPTION OF THE PREFFERRED EMBODIMENT

Figure 1:
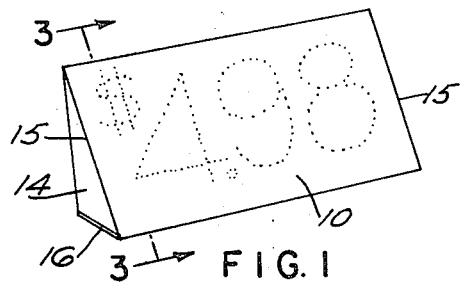
FIG. 1 is a perspective view of the sign incorporating this invention.
Figure 2:
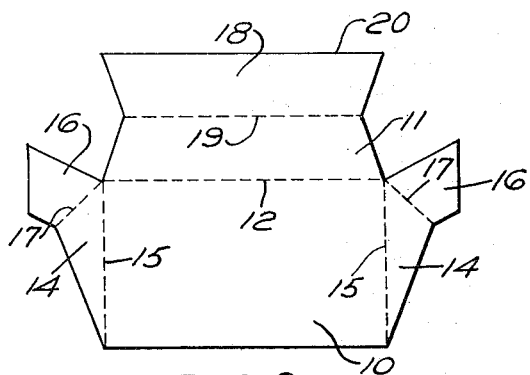
FIG. 2 is a plan view of a single piece of sheet material cut out in the shape to be folded into position shown in FIG. 1.
Figure 3:
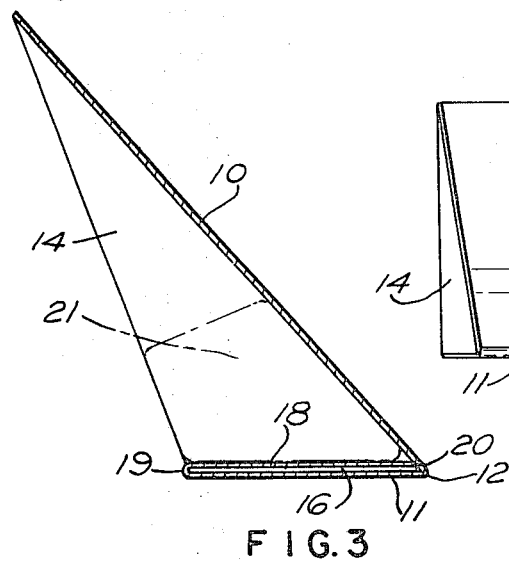
FIG. 3 is a section on line 3—3 of FIG. 1.
Figure 4:
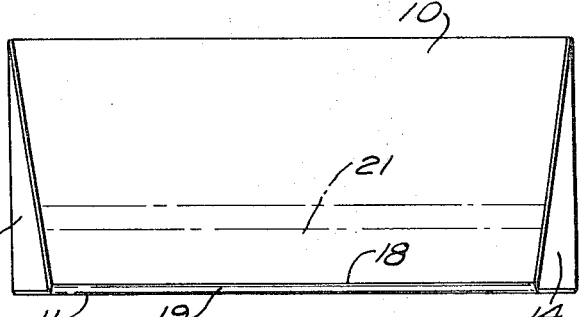
FIG. 4 is a rear view showing in dotted lines a weight positioned on the base section.
Figure 5:
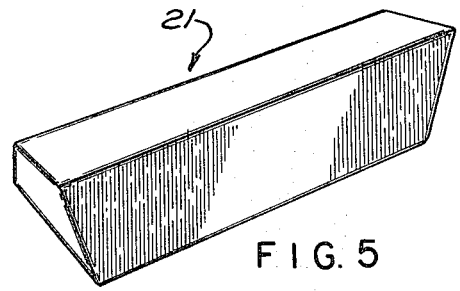
FIG. 5 is a perspective view of the weight which may be used.

With reference to FIGS. 1–5, FIG. 2 shows a sheet of cardboard or heavy paper cut out in a form to provide a display section 10 with a base section 11 folded therefrom along the line 12 and with side sections 14 folded along the lines 15 from the display section 10. Tabs 16 at the lower edges of the side sections are folded along the line 17 from the side sections so as to lie over and in contact with the base section 11 by reason of the rearwardly inclined display section making with the base section an angle which will be complemental to the angle of the fold line 17 so that this fold line 17 in effect contacts the base section 11. In order to lock the tabs 16 in contact with the base section 11 which, in turn, will hold the side sections in substantially the position shown in FIG. 1, a locking section 18 is folded along the line 19 at the rear edge of the base section 11 which will be of a dimension between the fold line 19 and the edge 20 of this locking section so that the edge 20 will tuck beneath or in contact with the rear of the display section 10, locking the section 18 in position and also locking the tabs 16 in position beneath it as may be more clearly seen in FIG. 3. The sections thus folded up and shown in FIGS. 1, 2, 3 and 4 provide a unit which will stand alone by itself. In some cases a weight such as shown at 21 in a shape to fit into the recess formed in the back of the unit as shown at dotted lines in FIG. 4 may be provided which will serve to give the device a little more stability so that it will not be as easily blown aside or displaced.

Figure 7:
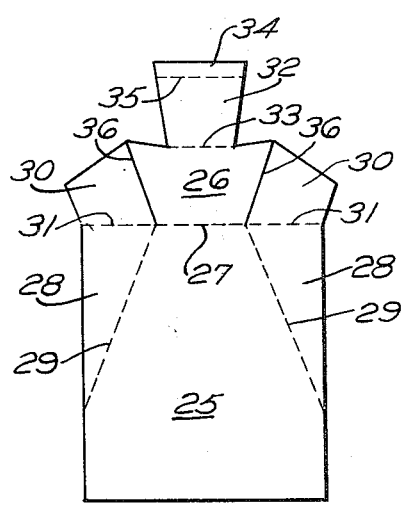
FIG. 7 is a plan view of the sheet cut out in the desired shape to form FIG. 6.
Figures 6, 8:
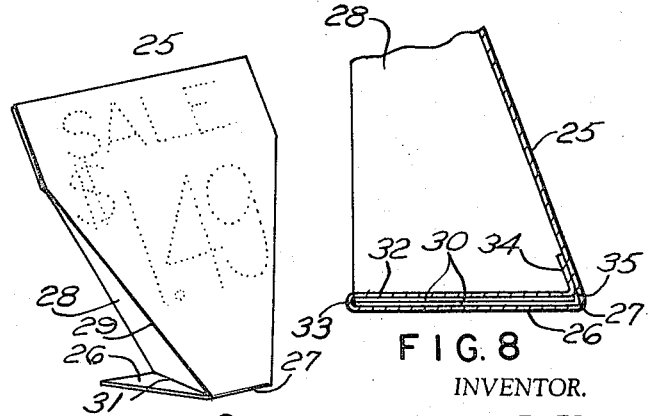
FIG. 6 is a perspective view of a modified form of sign.
FIG. 8 is a section centrally of FIG. 6.

In FIGS. 6–8 the display section is designated 25, a base section 26 is folded rearwardly therefrom at the lower edge along the fold line 27, side sections 28 are folded from the display section as at 29 while tabs 30 folded along the lines 31 of the side sections may extend over the base 26 and be locked into position by a locking section 32 which is folded forwardly along the line 33 from the rear edge of the base section 26 and has a lip 34 folded along the line 35 to have increased friction along the back of the display section 25 as may be seen in FIG. 8. In this case the walls 28 taper inwardly and the base 26 extends out beyond the side walls as may be seen in FIG. 6 in perspective. This arrangement is similar to FIGS. 1–4 above described. It will be understood that the full line 36 is a severance line and not a fold line and also that the two tabs 30 overlap beneath the locking section 32.

Figure 9:
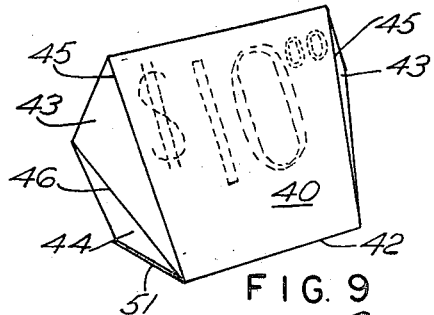
FIG. 9 is a perspective view of a different modification.
Figure 10:
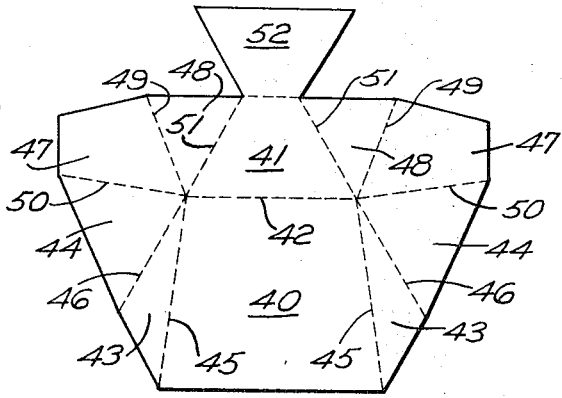
FIG. 10 is a plan view of the sheet cut out in the shape to form FIG. 9.

In FIGS. 9 and 10 the display section is designated 40, the base section 41 is folded along the line 42 to extend rearwardly from the lower edge of the display section with the side sections formed in two parts 43 and 44 folded along the line 45 rearwardly from the display section and folded intermediate their combined extent along the fold line 46 so as to provide an outward bulge with a bevel-like formation at either side as seen in perspective in FIG. 9. In this case the tabs are also in two parts 47 and 48 hinged to each other along the fold line 49 and also connected to the side sections and the base section by fold lines 50 and 51 so that these tabs are folded one on top of the other and then over the base section 41 where they are secured by some suitable means such as a staple or adhesive or by the section 52 which is folded over them and frictioned against the rear of the display section 40.

Figure 11:
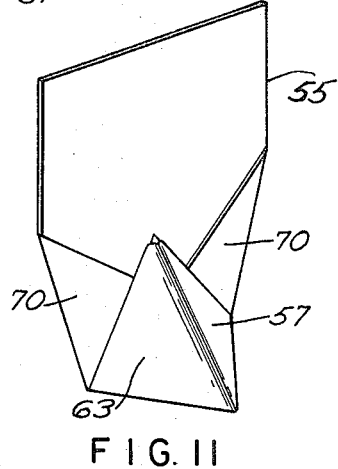
FIG. 11 is a rear perspective view of a still different modification.
Figure 12:
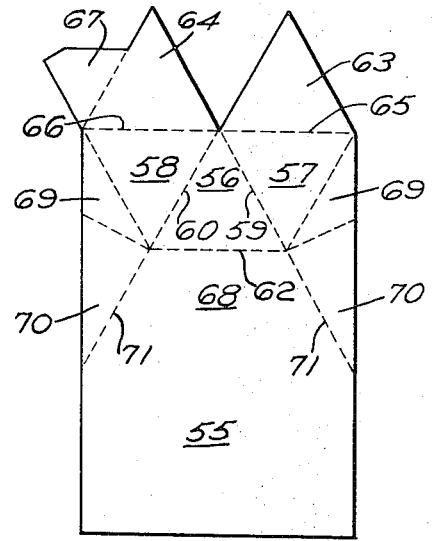
FIG. 12 is a plan view of the sheet cut out in the shape to form FIG. 11 and showing in dotted lines the fold lines to form FIG. 11.

In FIGS. 11 and 12 a still different form is shown in which there is a display section 55 with a composite hollow base formed of a plurality of triangular sections as bottom 56, and sides 57 and 58 hinged to the bottom section along the lines 59 and 60 with the bottom hinged to the display section along the line 62 so as to form a hollow upstanding base while the side sections 57, 58 each have a tab 63 and 64 hinged as at 65, 66 to the side sections and are secured together face to face and overlap side section 58, while tab 67 folded from tab 64 abuts and is secured in face to face relation with the back of the display section at 68. The sections 69, 70 intermediate the sections 57, 58 and the rear of the display section fold in with the sections 70 folding along fold lines 71 into face to face relation with the rear of display section 55. This hollow base may contain a weight if desired.

Figure 14:
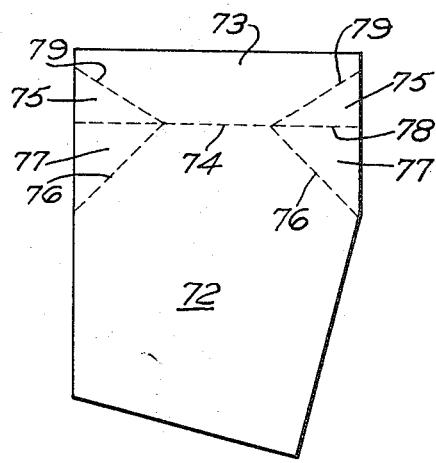
FIG. 14 is a plan view of the sheet cut out in the shape to form FIG. 13 before folded into finished position.
Figure 13:
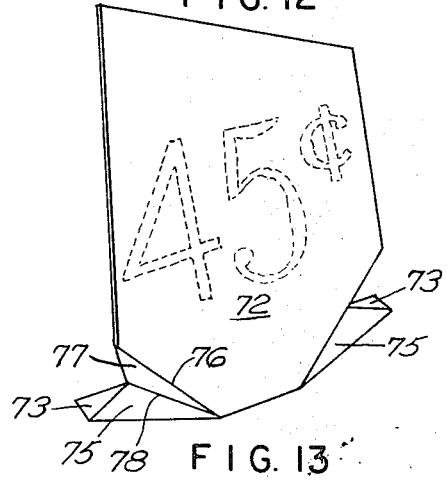
FIG. 13 is a perspective view of a still different modification.

In the showing in FIGS. 13 and 14, the display section is designated 72 with a base section 73 hinged thereto along fold line 74 with side sections 77 connected to the display section along fold line 76 and connected to the base by tab sections 75 hinged as at 78 to the side sections and as at 79 to the base section and folded inwardly with section 75 secured in face to face relation with base 73, as shown in FIG. 13, and secured by an adhesive or a tape in this partially folded position so as to give the inclination desired.

Figure 15:
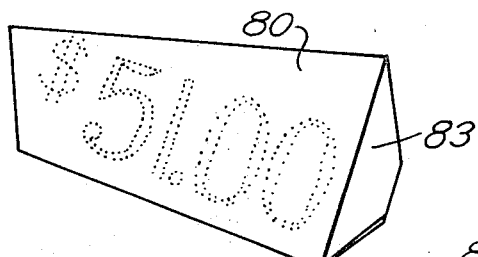
FIG. 15 is a perspective view of a still different modification.
Figure 16:
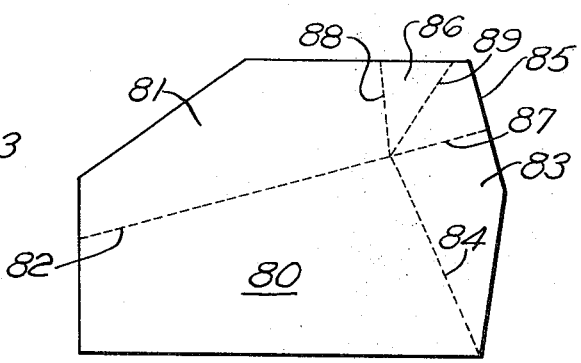
FIG. 16 is a plan view of the sheet cut out in the shape to form FIG. 15.

In the modification shown in FIGS. 15 and 16, the display section is designated as 80, and the base section 81 is folded rearwardly from the display section along line 82, while there is a side section 83 along one edge of the display section connected by the fold line 84. A connecting tab comprises two sections or areas 85 and 86 connected by the fold line 87 to the side section 83 and by fold line 88 to the base section 81 and connected to each other by the fold line 89, which tab may be folded and secured to the base section 81 by a staple or adhesive to hold the display and side section in the relative position as shown in FIG. 15.

Figure 17:
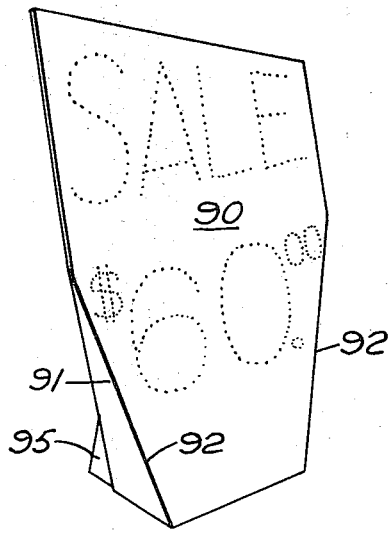
FIG. 17 is a perspective view of a different modification.
Figure 18:
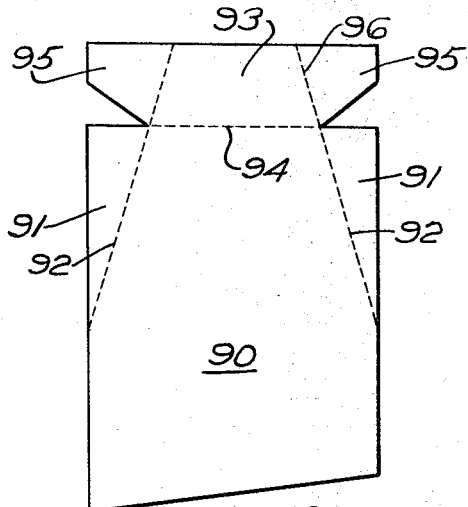
FIG. 18 is a plan view of the sheet cut out in the shape to form FIG. 17.

In FIGS. 17 and 18 the display section is designated 90 with side sections 91 connected by the fold lines 92 to the section 90, while there is a base section 93 connected by the fold line 94 to the display section 90. Tabs 95 folded from the base section along the line 96 may be secured to the side sections 91 by adhesive or staples to hold the device in the position shown in FIG. 17.

Figure 19:
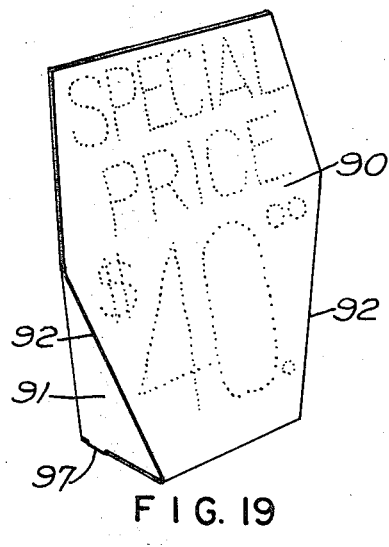
FIG. 19 is a perspective view along the lines of FIG. 17 but slightly modified.
Figure 20:
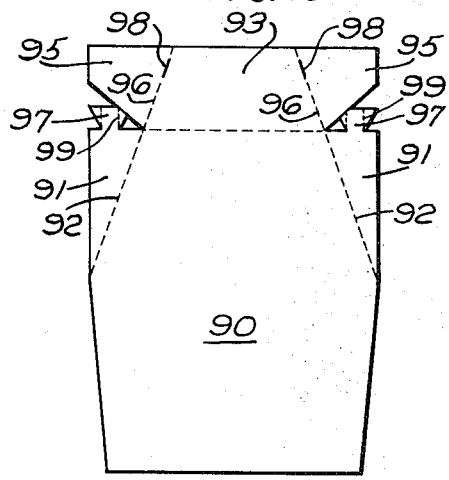
FIG. 20 is a plan view of the sheet of material cut out in the shape to form FIG. 19.

FIGS. 19 and 20 are similar to the showing in FIGS. 17 and 18 except there is a locking tongue 97 which may be inserted through a slot 98 in the fold line 96 so as to be bent upwardly and lock the tabs 95 and 91 in their relative position to hold the device as shown in FIG. 19. These tabs 97 are dovetailed and may be folded along lines 99 for insertion through the slot 98 after which they may flare out into the dovetail shape to lock them in position.

FIGS. 21 and 22 have a display section 100 and a base section 101 that extends rearwardly from the lower edge of the display section from the fold line 102. Section 103 extends upwardly and angularly forward being hinged along the fold line 104 at the rear edge of the base section to a point in contact with the rear surface of the display section 100, and here a further section 105 hinged along the fold line 106 extends downwardly in face to face relation with the rear surface of the display section 100 with a lip section 107 hinged along the fold line 108 extending rearwardly from this section 105. Laterally extending tab sections 109 extending oppositely from the display section 100 are hinged along the fold lines 110 from the display section to extend over the section 105 and lock the sections in the triangular formation above described and as shown in FIG. 21.

In FIGS. 23 and 24 the display section is designated 112. Laterally extending sections 113 extend as side sections from the display section 112, while the base is composed of a composite number of sections; a bottom section 114 is hinged along the fold line 115 from the lower edge of the display section 112, there being connecting sections between the side sections 113 and the bottom section 114 by a plurality of sections 116, 117 and 118 connected to the bottom section along the fold line 119 and to the side section along the fold line 120 while they are connected to each other along the fold lines 121 and 122. A slit at 123 occurs along the fold line 122 of one of the connecting sections. In folding this composite base into final position, sections 116 and 117 are secured together in face to face relation, while sections 118 are secured to the section 114. This brings the sections 116, 117 and 118 on one side in overlapping relation with the sections 116, 117 and 118 on the other side of the base section 114, and in order to provide a composite securing, the sections 116, 117 and 118 on one side are passed through the slit 123 along the fold line 122 on the other side so as to bring these parts into interlocking relation to be secured in the position such as shown in FIG. 23.

In FIGS. 25, 26 and 27 the display section is designated 125 which has a backing section 126 folded rearwardly therefrom as at 127 and is substantially of the same height as section 125 so that when folded as seen in FIGS. 25 and 27 it will extend nearly the full length along the back of section 125. The base section 128 extends rearwardly from the display section along the fold line 129 and then is again folded as at 130 to provide a section 131 extending upwardly at an angle to the base section 128 and then section 133 hinged at fold line 132 extends downwardly toward the base section and parallel to display section 125. The sheet is again folded along the fold line 134 to provide a lip 135 which extends upwardly around the lower edge of the section 126 forming a lock therewith while leaving a space as at 136 into which a card 137 may be inserted if desired. Lateral extending sections 140 hinged from the display section 125 extend rearwardly about the fold line 141 and embrace the sections 126, 133 locking the display and base sections in substantially the triangular formation shown in section in FIG. 27.

FIGS. 30 and 31 are very similar to FIG. 26 with the exception that a section 145 having a fold line 146 extends from the section 133 and is folded about the fold line 146 rearwardly along the base section 128 as seen in FIG. 30 rather than upwardly along the display section 125 as shown in FIGS. 25, 26 and 27. The other parts are the same.

FIGS. 28 and 29 disclose a construction also similar to the last two described modifications in which there is a display section 151 with base sections 150 extending rearwardly from the fold line 152 between the display section and the base section. These sections are reinforced by a section 153 hinged to section 151 along the fold line 154 and doubled over onto the base section 151 providing two thicknesses of base section. The section 155 hinged along the fold line 156 then extends rearwardly along the base section 150 reinforcing the base section and then section 158 is hinged along fold line 157 to extend upwardly and then again folded as at 159 providing a section 160 which extends downwardly with a lip 162 hinged along fold line 161 which extends rearwardly along the base section 155. These parts are held in this position by the laterally extending sections 163 on the base section 150 and the laterally extending sections 164 and 165 on display section 151 and its reinforcement section 153 which are hinged along the fold lines 166, 167 and 168 on either side of their sections so that they may be bent into interlocking position over a triangular formation section as seen in FIG. 28. Thus, there is a double flap along the display section 151, 153 performing this interlocking function. These laterally extending sections are of a width so as to fit tightly in the space which receives them between the sections and are thus held in their locking position by their width size.

I claim:

1. A self-supporting sign comprising a single piece of card stock, said single piece of stock comprising an upstanding display section, a base section of substantial plane surface area folded from the lower edge of the display section to extend rearwardly therefrom and present a bottom surface in a single plane of substantial area, means to tie the display section and the base section together including a section integral with and extending laterally from the side edge of one of said sections and folded upon itself along the edge thereof over portions connected to the other section.

2. A self-supporting sign comprising a single piece of card stock, said single piece of stock comprising an upstanding display section, a base section of substantial plane surface area folded from the lower edge of the display section at an angle thereto presenting a bottom surface in a single plane of substantial area and a side section folded from the display section in the same relative direction from the display section as the direction of extent of the base section and means to secure said base and side sections in a definite relation to provide a stiffened structure of three different planes emanating from a point of juncture of the sections, said means comprising said side sections having tabs overlying the base section and an auxiliary base section overyling said tabs and base section with said auxiliary base section hinged to the base section and wedged against the display section.

3. A self-supporting sign comprising a single piece of card stock, said single piece of stock comprising an upstanding display section, a base section folded from the lower edge of the display section to extend rearwardly therefrom, means to tie the display section and the base section together including a section integral with and extending laterally from the side edge of one of said sections and folded along the edge thereof and engaging the other section, said display section having two spaced parts to receive a card between said parts.

References Cited

UNITED STATES PATENTS

| | | |
|---|---|---|
| 1,986,550 | 1/1935 | Ziemerman. |
| 2,803,076 | 8/1957 | Viglietta _____ 248—459 X |
| 3,273,272 | 9/1966 | Paige _____ 40—124.1 |

EUGENE R. CAPOZIO, Primary Examiner

W. J. CONTRERAS, Assistant Examiner